United States Patent
Lin et al.

(10) Patent No.: US 11,176,699 B2
(45) Date of Patent: Nov. 16, 2021

(54) AUGMENTING RELIABLE TRAINING DATA WITH CYCLEGAN FOR HAND POSE ESTIMATION

(71) Applicant: TENCENT AMERICA LLC, Palo Alto, CA (US)

(72) Inventors: Shih-Yao Lin, Palo Alto, CA (US); Yusheng Xie, Mountain View, CA (US); Kun Wang, San Jose, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 96 days.

(21) Appl. No.: 16/421,607

(22) Filed: May 24, 2019

(65) Prior Publication Data
US 2020/0372668 A1    Nov. 26, 2020

(51) Int. Cl.
*G06T 7/70* (2017.01)
*G06T 5/50* (2006.01)
(Continued)

(52) U.S. Cl.
CPC .......... *G06T 7/70* (2017.01); *G06N 3/08* (2013.01); *G06T 5/50* (2013.01); *G06T 11/60* (2013.01);
(Continued)

(58) Field of Classification Search
CPC ... G06T 5/50; G06T 7/70; G06T 11/60; G06T 15/506; G06T 19/006; G06T 19/20; G06T 2207/20081; G06T 2207/20084; G06T 2207/30196; G06T 2207/2219; G06T 2207/2012; G06F 3/017; G06F 3/0454; G06F 3/0472; G06F 3/08; G06K 9/00355; G06K 9/00671
See application file for complete search history.

(56) References Cited

U.S. PATENT DOCUMENTS 10,110,881 B2    10/2018    Shotton et al.
10,289,903 B1 *    5/2019    Chandler ............. G06N 3/0454
(Continued)

FOREIGN PATENT DOCUMENTS

JP            6246757 B2    12/2017

OTHER PUBLICATIONS

Mueller et al. "Ganerated hands for real-time 3d hand tracking from monocular rgb." Proceedings of the IEEE Conference on Computer Vision and Pattern Recognition. Jun. 2018. (Year: 2018).*
(Continued)

*Primary Examiner* — Katrina R Fujita
(74) *Attorney, Agent, or Firm* — Sughrue Mion, PLLC

(57) ABSTRACT

A method and apparatus for generating augmented training data for hand pose estimation include receiving source data that is associated with a first lighting condition. Target data that is associated with a second lighting condition is received. A lighting condition translation between the first lighting condition and the second lighting condition is determined. Lighting translated data is generated based on the lighting condition translation and the source data. Augmented training data for hand pose estimation is generated based on the target data and the lighting translated data.

11 Claims, 4 Drawing Sheets

(51) Int. Cl.
*G06T 11/60* (2006.01)
*G06N 3/08* (2006.01)

(52) U.S. Cl.
CPC ............. *G06T 2207/20081* (2013.01); *G06T 2207/20084* (2013.01); *G06T 2207/30196* (2013.01)

(56) References Cited

U.S. PATENT DOCUMENTS

| | | | | |
|---|---|---|---|---|
| 10,860,836 | B1* | 12/2020 | Tyagi | G06N 3/0454 |
| 2017/0168586 | A1 | 6/2017 | Sinha et al. | |
| 2019/0066493 | A1* | 2/2019 | Sohn | G06K 9/6268 |
| 2019/0107894 | A1* | 4/2019 | Hebbalaguppe | G06F 3/011 |
| 2019/0251340 | A1* | 8/2019 | Brown | G06N 3/0445 |
| 2019/0251674 | A1* | 8/2019 | Chang | G06N 3/08 |
| 2019/0340810 | A1* | 11/2019 | Sunkavalli | G06T 15/506 |
| 2020/0184668 | A1* | 6/2020 | Rad | G06T 7/50 |
| 2020/0184721 | A1* | 6/2020 | Ge | G06T 7/50 |
| 2020/0327418 | A1* | 10/2020 | Lyons | G06K 9/469 |
| 2020/0334828 | A1* | 10/2020 | Oztireli | G06T 7/75 |
| 2021/0124425 | A1* | 4/2021 | Liu | G06K 9/6256 |
| 2021/0201526 | A1* | 7/2021 | Moloney | G06N 3/084 |
| 2021/0248358 | A1* | 8/2021 | Lee | G06K 9/00355 |

OTHER PUBLICATIONS

Chen et al. "Generating Realistic Training Images Based on Tonality-Alignment Generative Adversarial Networks for Hand Pose Estimation." arXiv preprint arXiv:1811.09916 (Dec. 2018). (Year: 2018).*

Fei Jia et al., "Everyone could be Artist: sketch to style-specified artwork", CS230: Deep Learning, Winter 2018, Retrieved from the Internet <URL: http://cs230.stanford.edu/projects_fall_2019/reports/26261179.pdf>, pp. 1-6 (total 6 pages).

International Search Report dated Jun. 24, 2020 in PCT/US2020/025257 [PCT/ISA/210].

Written Opinion of the International Searching Authority dated Jun. 24, 2020 in PCT/US2020/025257 [PCT/ISA/237].

* cited by examiner

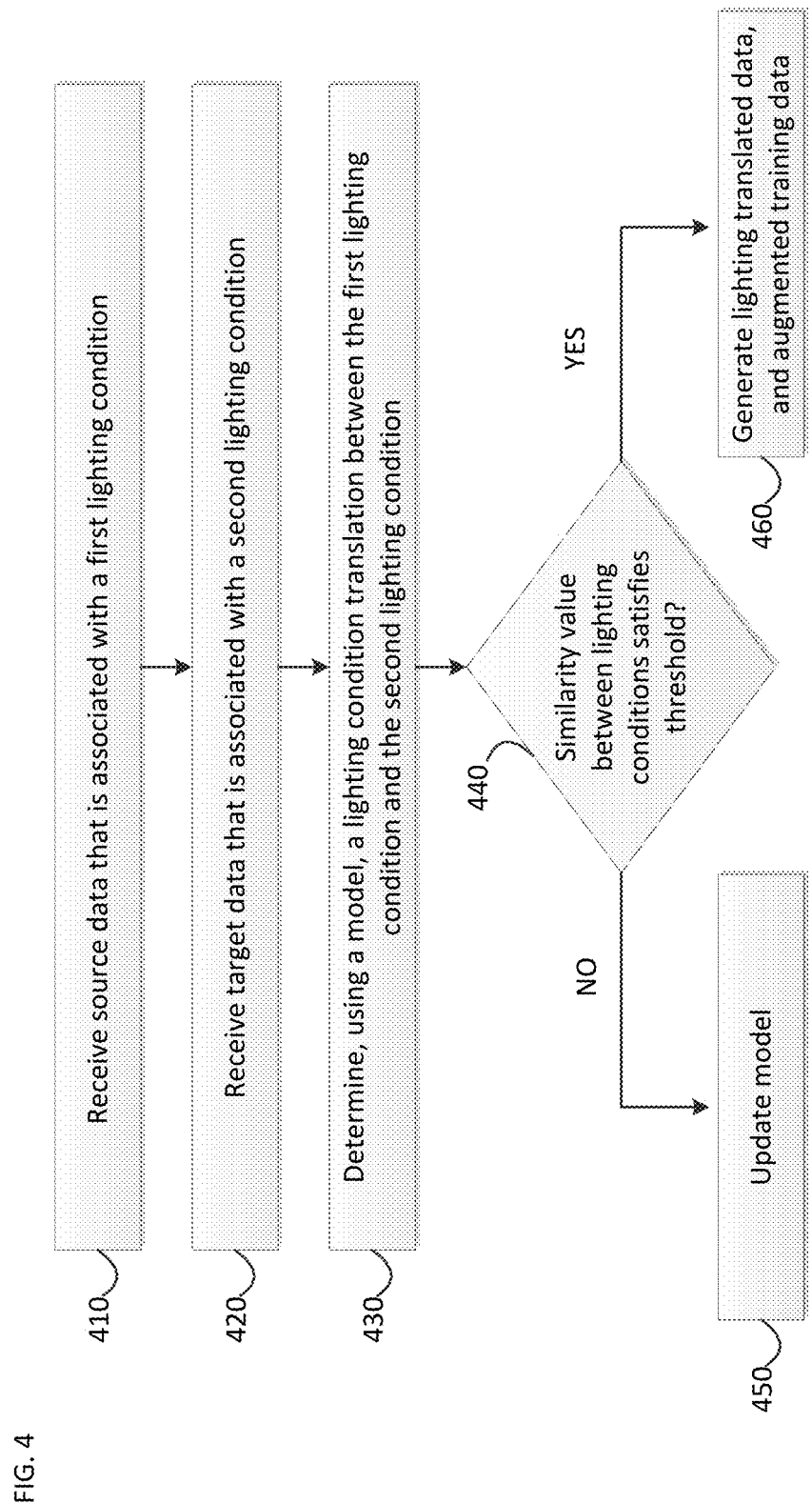

AUGMENTING RELIABLE TRAINING DATA WITH CYCLEGAN FOR HAND POSE ESTIMATION

BACKGROUND

Estimating human hand poses has drawn increasing attention for decades due to its wide applicability to many areas, such as human behavior analysis, health-care, robotics, human-computer interaction, etc. Recent research efforts have successfully leveraged deep neural networks (DNNs) to infer hand poses from a monocular image or a depth map. Despite relatively good performance, inferring hand poses with DNNs requires a large amount of training data. This requirement may not be satisfied in practice.

SUMMARY

According to an aspect of the disclosure, a method for generating augmented training data for hand pose estimation includes receiving, by a device, source data that is associated with a first lighting condition; receiving, by the device, target data that is associated with a second lighting condition; determining, by the device and using a model, a lighting condition translation between the first lighting condition and the second lighting condition; generating, by the device, lighting translated data using the source data based on the lighting condition translation between the first lighting condition and the second lighting condition; and generating, by the device, the augmented training data for hand pose estimation based on the target data and the lighting translated data.

According to an aspect of the disclosure, a device comprises at least one memory configured to store program code; and at least one processor configured to read the program code and operate as instructed by the program code, the program code including: receiving code that is configured to cause the at least one processor to: receive source data that is associated with a first lighting condition; and receive target data that is associated with a second lighting condition; determining code that is configured to cause the at least one processor to determine, using a model, a lighting condition translation between the first lighting condition and the second lighting condition; and generating code that is configured to cause the at least one processor to: generate lighting translated data using the source data based on the lighting condition translation between the first lighting condition and the second lighting condition; and generate augmented training data for hand pose estimation based on the target data and the lighting translated data.

According to some possible implementations, a non-transitory computer-readable medium stores instructions, the instructions comprising: one or more instructions that, when executed by one or more processors of a device, cause the one or more processors to: receive source data that is associated with a first lighting condition; receive target data that is associated with a second lighting condition; determine, using a model, a lighting condition translation between the first lighting condition and the second lighting condition; generate lighting translated data using the source data based on the lighting condition translation between the first lighting condition and the second lighting condition; and generate augmented training data for hand pose estimation based on the target data and the lighting translated data.

BRIEF DESCRIPTION OF THE DRAWINGS

FIG. 4 is a flow chart of an example process for generating augmented training data using a cycle-consistent adversarial network (CycleGAN).

DETAILED DESCRIPTION

Figure 1:
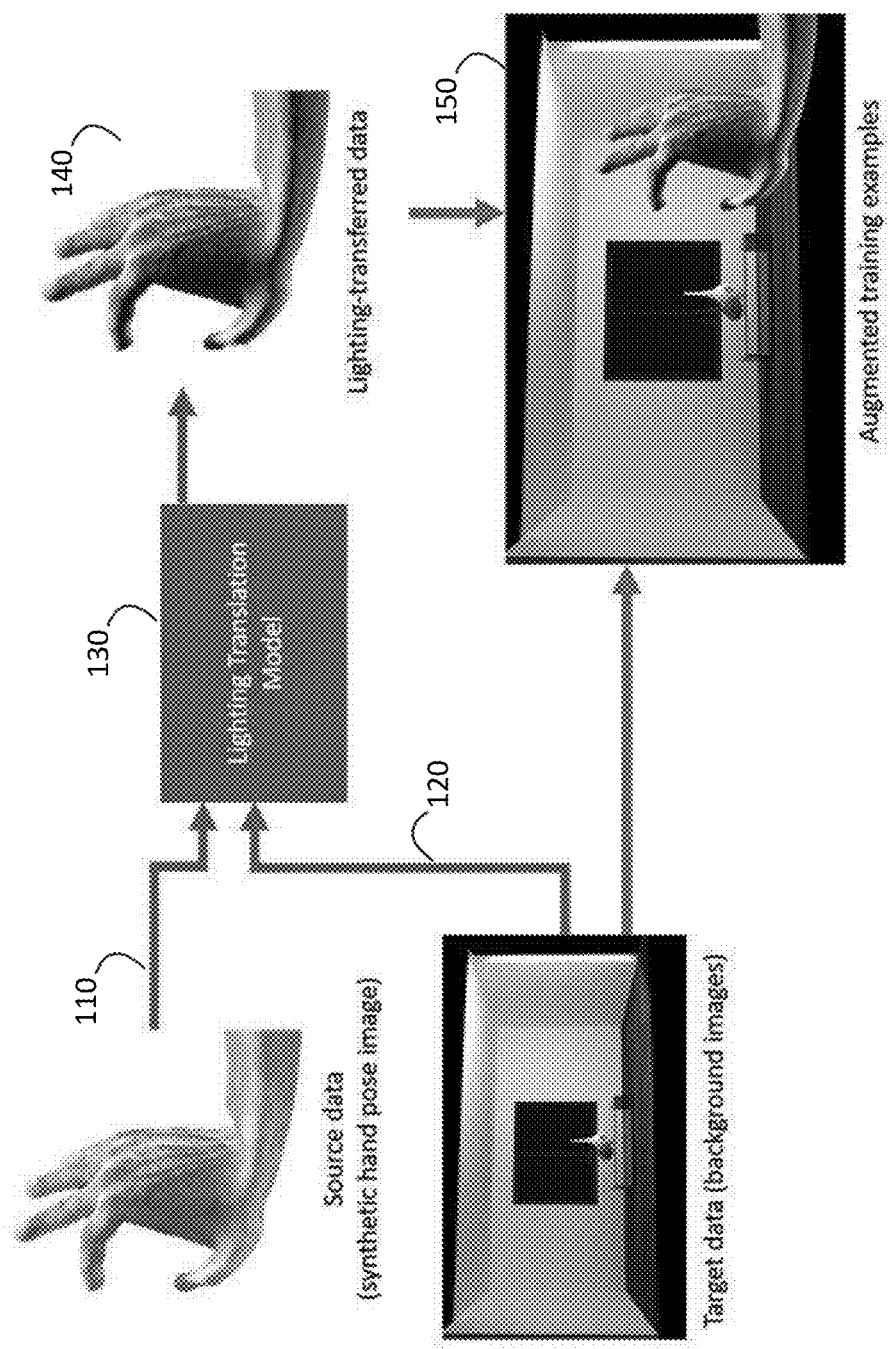
FIG. 1 is a diagram of an overview of an example implementation described herein.

The present disclosure provides a data augmentation approach for generating reliable augmented training data to train a robust deep model for hand pose estimation. Utilizing various three dimensional (3D) model simulators such as Blender, Maya, 3DMAX, and/or the like, some implementations herein easily produce a vast amount of synthetic 3D hand pose images for model training.

The synthetic hand pose images can be represented with various hand poses, and can include different lighting conditions. In order to produce realistic training examples, the augmented data can be generated by attaching synthetic hand pose images into real world background images. To improve the accuracy of the generated images, some implementations herein provide an image-to-image style translation scheme based on Cycle-Consistent Adversarial Networks (CycleGANs) to learn the mapping between the lighting conditions of the synthetic hand pose images (source images) to the background images (target images).

Inferring hand poses from a monocular image (or a depth map) with a DNN requires a vast amount of training examples. This requirement may not be satisfied in practice. To solve this problem, there are two main solutions which are provided as follows.

Transfer learning is one widely adopted solution for training neural networks with limited training data. A DNN model is trained in advance with a large dataset in the source domain. By learning the transformation from the source to target domains, the DNN model in the target domain can re-use the parameters from that in the source domain and is fine-tuned with limited training data.

Recent research efforts provide improved pose estimation models by training the models with a large amount of synthetic examples. The synthetic data can be easily generated using any commercial 3D model simulators. Leveraging synthetic training data for model training can alleviate the problem of limited training data.

There are two crucial limitations for transfer learning and data augmentation schemes by the simulators.

Transfer learning might only work when data modalities in the source and target domains are the same, e.g., images. In modern real-world applications, data can be captured using various emerging or customized devices, such as accelerometers, gyroscopes, data-gloves, optical motion-capture systems, etc. On the other hand, the scale of the public hand-pose datasets is still insufficient.

Regarding synthetic data produced by simulators, the main problem of this strategy is that the synthetic background is unrealistic. To generate more realistic data for model training, combining synthetic hand pose images and real-world background images is more appropriate. However, the lighting conditions between these two images might be inconsistent.

Generative Adversarial Networks (GAN) can be trained to translate an image from one into another and vice versa. The goal of standard image-to-image translation is to learn the mapping between an input image and an output image using a training set of aligned image pairs. Yet, paired training data for many tasks might not be available. CycleGAN has been developed for translating an image from a source domain X to a target domain Z in the absence of paired training examples. To solve the problem of different lighting conditions of the synthetic hand pose images and the background images, the present disclosure provides a method to leverage CycleGAN to determine the lighting translation from synthetic hand pose images to the background images to generate data that looks more realistic. In this way, models may be trained using this improved training data, thereby improving the functionality and accuracy of the models.

FIG. 1 is an overview of a method for generating augmented training data for hand pose estimation.

As shown in FIG. 1, and by reference number 110, a lighting translation model receives source data. The source data may include a synthetic hand pose image that is associated with a first lighting condition. For example, the first lighting condition may refer to color parameters, values, hues, tones, effects, etc. of the synthetic hand pose image. The source data may be generated using a three dimensional model simulator.

As shown by reference number 120, the lighting translation model receives target data. The target data may include a real-world image that is associated with a second lighting condition. For example, the second lighting condition may refer to color parameters, values, hues, tones, effects, etc. of the real-world image. Further, the second lighting condition may be different than the first lighting condition. In other words, the synthetic hand pose image and the real-world image, if superimposed, may appear unrealistic.

As shown by reference number 130, the lighting translation model may determine a lighting condition translation. The lighting translation model may be a cycle-consistent adversarial network (CycleGAN). Further, the lighting translation model may be configured to determine a lighting condition translation based on source data and target data. For example, a lighting condition translation may refer to a value, quantity, etc. that maps lighting conditions. As a particular example, a lighting condition translation may refer to a value, quantity, etc. that maps the first lighting condition of the synthetic source image and the second lighting condition of the real-world image.

As shown by reference number 140, the lighting translation model may generate lighting translated data. The lighting translated data may include the source data that is adjusted using the lighting condition translation. In other words, the lighting translated data may be the source data that includes the second lighting condition instead of the first light condition. In this way, the lighting translated data and the target data include consistent lighting conditions.

As shown by reference number 150, augmented training data for hand pose estimation is generated based on the target data and the lighting translated data. The augmented training data may include the target data with superimposed lighting translated data.

In this way, synthetic hand pose images may be translated for different lighting conditions of target data, and added to various background images to increase the diversity of the training data, where the lighting conditions of the synthetic hand pose images and background images are consistent. In this way, a hand pose estimator model can be trained a large amount of the synthetic training data.

Some implementations herein determine the lighting translation mapping between source images and target images by using CycleGANs.

Further, and in this way, some implementations herein generate synthetic training examples that are more realistic and reliable. Ultimately, hand pose estimation models may be trained using this generated training data, thereby improving accuracy of the hand pose estimation models.

Figure 2:
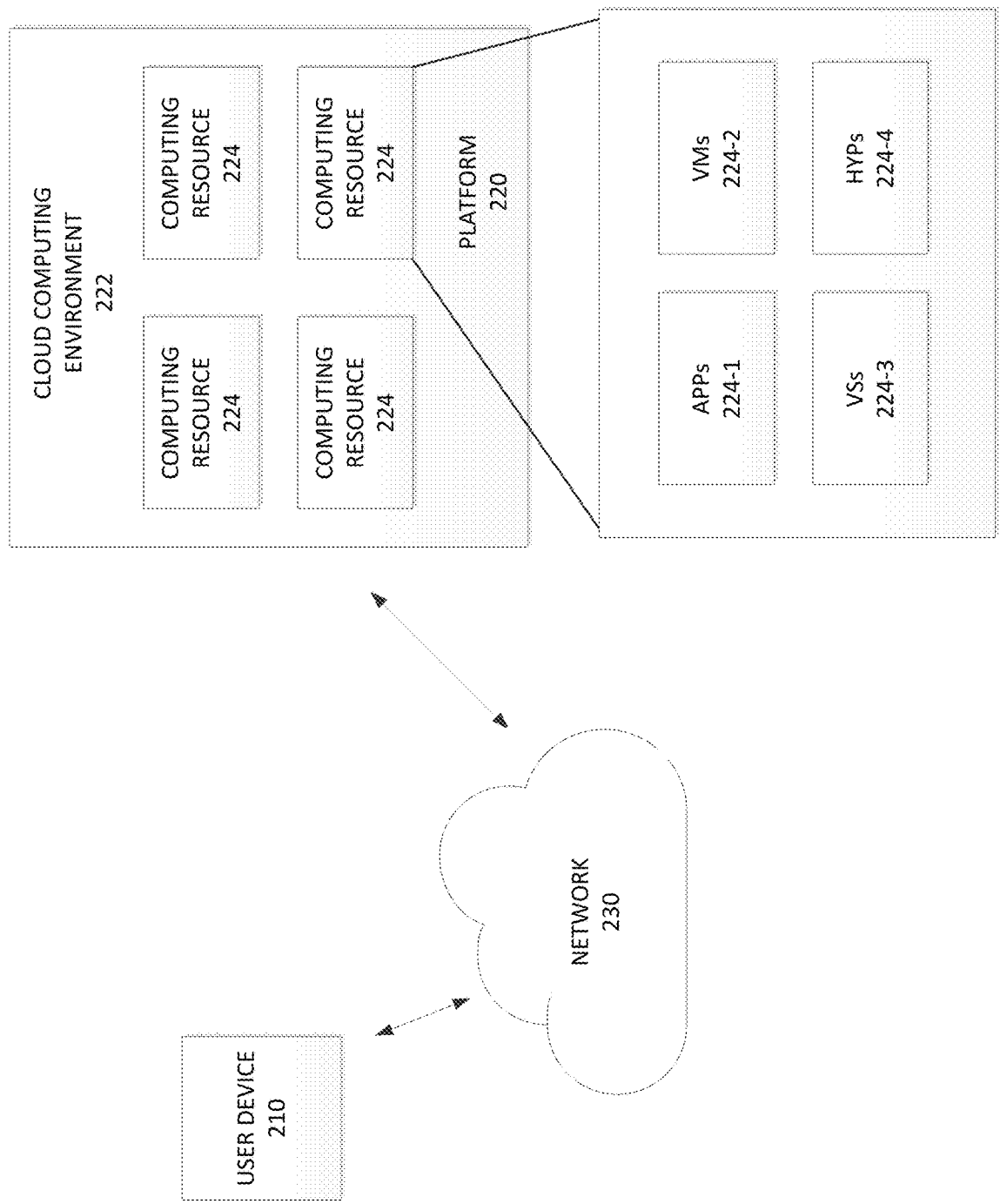
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of generating augmented training data for hand pose estimation, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
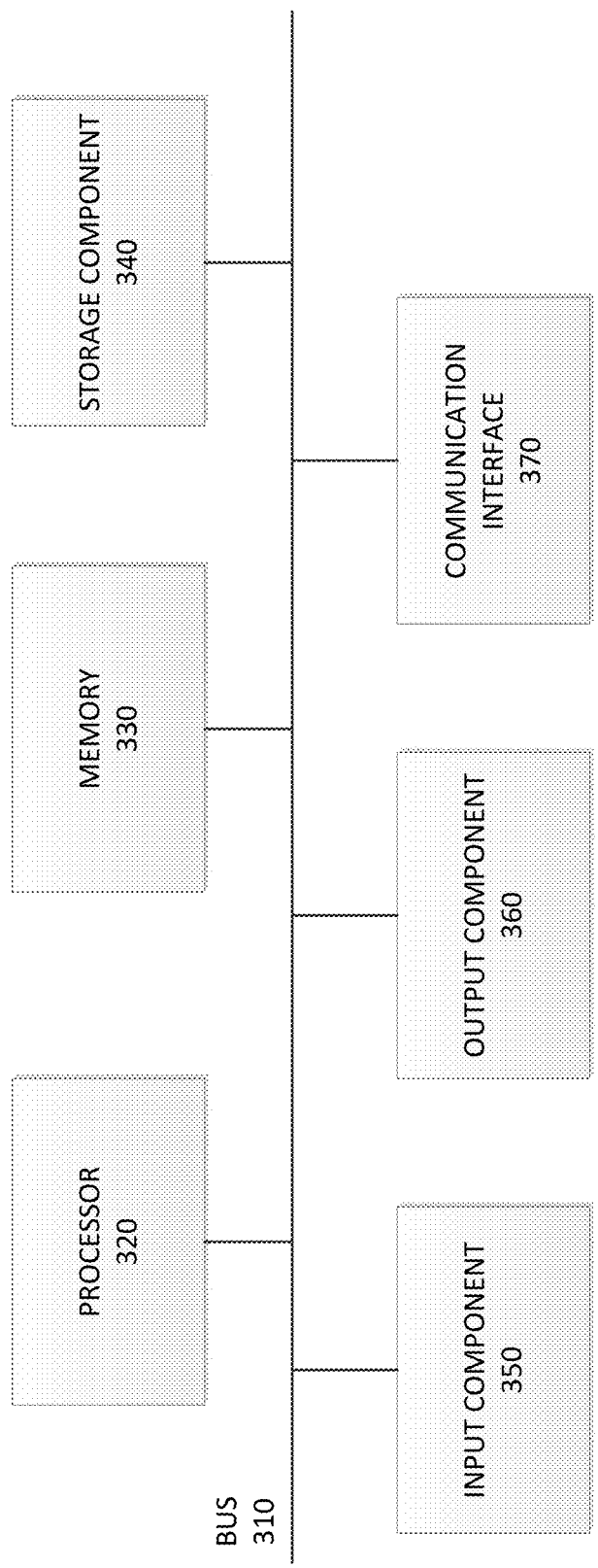
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating augmented training data for hand pose estimation. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process 400 may include receiving source data that is associated with a first lighting condition (block 410).

As further shown in FIG. 4, process 400 may include receiving target data that is associated with a second lighting condition (block 420).

As further shown in FIG. 4, process 400 may include determining, using a model, a lighting condition translation between the first lighting condition and the second lighting condition (block 430).

As further shown in FIG. 4, process 400 may include determining whether a similarity value between a translated lighting condition and the second lighting condition satisfies a threshold (block 440). For example, the translated lighting condition may refer to an adjusted first lighting condition.

As further shown in FIG. 4, if the similarity value does not satisfy the threshold (block 450—NO), then process 400 may include updating the model.

As further shown in FIG. 4, if the similarity value does satisfy the threshold (block 450—YES), then process 400 may include generating lighting translated data, and augmented training data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating augmented training data for hand pose estimation, comprising:
   receiving, by a device, synthetic hand pose image that includes a first lighting condition;
   receiving, by the device, a background image that includes a second lighting condition;
   determining, by the device and by inputting only the synthetic hand pose image and the background image into a CycleGAN, a lighting condition translation that maps the first lighting condition and the second lighting condition;
   generating, by the device, a lighting translated synthetic hand pose image using the synthetic hand pose image based on the lighting condition translation between the first lighting condition and the second lighting condition; and
   generating, by the device, the augmented training data including the lighting translated synthetic hand pose image that is superimposed on the background image for hand pose estimation based on the background image and the synthetic hand pose image.

2. The method of claim 1, further comprising:
   training a hand pose estimation model using the augmented training data.

3. The method of claim 1, further comprising:
   generating, using a three dimensional model simulator, the synthetic hand pose image that represents a hand pose.

4. The method of claim 1, wherein the background image is a real-world image.

5. A device, comprising:
   at least one memory configured to store program code;

at least one processor configured to read the program code and operate as instructed by the program code, the program code including:

receiving code that is configured to cause the at least one processor to:
  receive a synthetic hand pose image that includes a first lighting condition; and
  receive a background image that includes a second lighting condition;

determining code that is configured to cause the at least one processor to determine, by inputting only the synthetic hand pose image and the background image into a CycleGAN, a lighting condition translation that maps the first lighting condition and the second lighting condition; and generating code that is configured to cause the at least one processor to:
  generate a lighting translated synthetic hand pose image using the synthetic hand pose image based on the lighting condition translation between the first lighting condition and the second lighting condition; and
  generate augmented training data including the lighting translated synthetic hand pose image that is superimposed on the background image for hand pose estimation based on the background image and the lighting translated synthetic hand pose image.

6. The device of claim 5, further comprising:

training code that is configured to cause the at least one processor to train a hand pose estimation model using the augmented training data.

7. The device of claim 5, wherein the generating code is further configured to cause the at least one processor to generate, using a three dimensional model simulator, the synthetic hand pose image that represents a hand pose.

8. The device of claim 5, wherein the background image is a real-world image.

9. A non-transitory computer-readable medium storing instructions, the instructions comprising: one or more instructions that, when executed by one or more processors of a device, cause the one or more processors to:

receive a synthetic hand pose image that includes a first lighting condition;

receive a background image that includes a second lighting condition;

determine, by inputting only the synthetic hand pose image and the background image into a CycleGAN, a lighting condition translation that maps the first lighting condition and the second lighting condition;

generate a lighting translated synthetic hand pose image using the synthetic hand pose image based on the lighting condition translation between the first lighting condition and the second lighting condition; and generate augmented training data including the lighting translated synthetic hand pose image that is superimposed on the background image for hand pose estimation based on the background image and the lighting translated synthetic hand pose image.

10. The non-transitory computer-readable medium of claim 9, wherein the one or more instructions cause the one or more processors to:

train a hand pose estimation model using the augmented training data.

11. The non-transitory computer-readable medium of claim 9, wherein the background image is a real-world image.

* * * * *